US010850605B2

(12) United States Patent
Satyaseelan et al.

(10) Patent No.: US 10,850,605 B2
(45) Date of Patent: Dec. 1, 2020

(54) HYBRID DRIVE MODULE HAVING A ROTOR SECURED TO A HUB UTILIZING STAKING OF AN END RING

(71) Applicant: SCHAEFFLER TECHNOLOGIES AG & CO. KG, Herzogenaurach (DE)

(72) Inventors: Ayyalraju Satyaseelan, Wooster, OH (US); Justin Persinger, Norton, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 408 days.

(21) Appl. No.: 15/456,884

(22) Filed: Mar. 13, 2017

(65) Prior Publication Data

US 2018/0257475 A1    Sep. 13, 2018

(51) Int. Cl.
*B60K 6/40* (2007.10)
*B60K 6/48* (2007.10)

(52) U.S. Cl.
CPC .................. *B60K 6/40* (2013.01); *B60K 6/48* (2013.01); *B60K 2006/4825* (2013.01); *B60Y 2200/92* (2013.01); *B60Y 2400/426* (2013.01); *Y02T 10/62* (2013.01); *Y10S 903/951* (2013.01)

(58) Field of Classification Search
CPC .......... F16H 41/28; F16H 45/02; B23P 15/00; B60K 6/36; B60K 6/26; B60K 6/442; F16D 48/00; H02K 1/02; H02K 1/27; H02K 11/225; H02K 15/00; H02K 15/02; H02K 7/10; H02K 7/108; H02K 1/28
See application file for complete search history.

(56) References Cited

U.S. PATENT DOCUMENTS

| | | | |
|---|---|---|---|
| 1,192,404 A | 7/1916 | Ewart | |
| 2,630,897 A | 3/1953 | Porter | |
| 3,525,888 A * | 8/1970 | Linn | H02K 7/1185 310/41 |
| 4,074,158 A | 2/1978 | Cole | |
| 5,234,278 A | 8/1993 | Hall, III et al. | |
| 5,423,568 A | 6/1995 | Zushi et al. | |

(Continued)

FOREIGN PATENT DOCUMENTS

DE    102013221643 A1    4/2015
EP    1150007 A2    10/2011
(Continued)

OTHER PUBLICATIONS

International Search Report and Written Opinion for PCT/US2018/016169, dated Apr. 19, 2018, 10 pages.

(Continued)

*Primary Examiner* — Tran N Nguyen
*Assistant Examiner* — Leda T Pham

(57) ABSTRACT

A hybrid drive module, comprising a cover of a torque converter. The hybrid drive module further includes a carrier hub connected to a rotor of an electric motor and the cover, the hub including a first surface and a protrusion extending outward from the first surface. The hybrid drive module also includes an end ring disposed between the protrusion and the rotor and in contact with the first surface, wherein the end ring is engaged with the protrusion and the rotor, and the protrusion restrains the end ring and rotor utilizing an interference fit between the carrier hub and the end ring.

20 Claims, 2 Drawing Sheets

(56) References Cited

U.S. PATENT DOCUMENTS

| | | |
|---|---|---|
| 5,931,271 A | 8/1999 | Haka |
| 6,382,606 B1 | 5/2002 | Horng |
| 6,668,953 B1 | 12/2003 | Reik et al. |
| 7,954,578 B2 | 6/2011 | Kim et al. |
| 7,980,781 B2 | 7/2011 | Trice |
| 9,140,311 B2 * | 9/2015 | Iwase ................. F16D 25/0638 |
| 9,528,559 B2 | 12/2016 | Lee et al. |
| 2002/0036434 A1 | 3/2002 | Tsuzuki et al. |
| 2002/0065171 A1 | 5/2002 | Raber |
| 2004/0045752 A1 * | 3/2004 | Omote ..................... B60K 6/26 180/65.26 |
| 2005/0180047 A1 * | 8/2005 | Suzuki ............... G11B 17/0287 360/99.12 |
| 2007/0257569 A1 | 11/2007 | Heyder |
| 2009/0255506 A1 * | 10/2009 | Walker ...................... F01C 1/28 123/212 |
| 2010/0079029 A1 | 4/2010 | Muller |
| 2010/0105518 A1 * | 4/2010 | Kasuya .................. B60K 6/387 477/5 |
| 2011/0057522 A1 | 3/2011 | Blessing et al. |
| 2012/0032544 A1 * | 2/2012 | Kasuya .................... B60K 1/00 310/90 |
| 2013/0057117 A1 * | 3/2013 | Suzuki ............... F16H 57/0412 310/60 R |
| 2014/0091649 A1 * | 4/2014 | Dragon ................ H02K 1/2766 310/51 |
| 2016/0105060 A1 | 4/2016 | Lindemann et al. |
| 2016/0109010 A1 | 4/2016 | Lindemann et al. |
| 2017/0043657 A1 | 2/2017 | Schmitt et al. |

FOREIGN PATENT DOCUMENTS

| | | |
|---|---|---|
| JP | 2000289475 A | 10/2000 |
| JP | 2004001708 A | 1/2004 |
| JP | 3864955 B2 | 1/2007 |
| JP | 2010252502 A | 11/2010 |
| WO | WO-2016075739 A1 * | 5/2016 ............... B60K 6/26 |

OTHER PUBLICATIONS

International Search Report for Application No. PCT/US2018/037983, dated Sep. 18, 2018, 9 pages.

* cited by examiner

HYBRID DRIVE MODULE HAVING A ROTOR SECURED TO A HUB UTILIZING STAKING OF AN END RING

TECHNICAL FIELD

The present disclosure relates generally to a hybrid drive module including an electric motor with a rotor. The rotor may be required to be secured to a hub.

BACKGROUND

Vehicles may utilize a hybrid combination of both an internal combustion engine and an electric motor to power the vehicle. A rotor of the electric motor may be secured to the hub to prevent movement of an end ring in contact with both the rotor and a carrier hub.

SUMMARY

According to a second embodiment, a hybrid drive module comprises a cover of a torque converter. The hybrid drive module further includes a carrier hub connected to a rotor of an electric motor and the cover, the hub including a first surface and a protrusion extending outward from the first surface. The hybrid drive module also includes an end ring disposed between the protrusion and the rotor and in contact with the first surface, wherein the end ring is engaged with the protrusion and the rotor, and the protrusion restrains the end ring and rotor utilizing an interference fit between the carrier hub and the end ring.

According to a second embodiment, a method of securing components to a carrier hub of a hybrid drive module includes a torque converter and an electric motor including a rotor, comprising connecting an end ring to the rotor and a protrusion extending outward from a first surface of the carrier hub. The method further includes providing an interference fit between the carrier hub and the end ring.

According to a third embodiment, a hybrid drive module, comprises a carrier hub connected to a rotor of an electric motor, the hub including a protrusion extending outward from a surface. The hybrid drive module further includes a'n end ring disposed between the protrusion and the rotor, wherein the end ring is engaged with the protrusion at the surface utilizing an interference fit between the carrier hub and the end ring.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A modular hybrid transmission module may include rotor segments installed onto a carrier riveted to a cover of a torque converter. The rotor segments may need to minimize or eliminate the capability of moving or shifting during functioning of the hybrid transmission module. Certain designs may utilize a ring, which is shrunk fit onto the carrier, to facilitate reduction of the movement. The ring may include a spring element on it, which may apply a compressive force on the rotor segments, or the ring may itself act as the spring element. The compressive force may prevent the rotor segments from moving during functioning. The force should aim to be above a particular minimum limit, which may be calculated based on the torque drive from the electric motor rotor. During temperature cycling, there may be a loss of shrink fit interference at elevated temperatures due to a different co-efficient of thermal expansions for the carrier and the shrunk fit ring. The loss of shrink fit loosens the spring element on the ring and thereby reduces the clamp load on the rotor to values below the minimum required limit, which may allow the rotor segments to move during functioning, which also be called a "walking phenomenon." Utilization of the same material for the end ring or the carrier may prevent the "walking phenomenon." Also, there may be an option to shrink fit rotor segments onto the carrier and eliminate the need for a spring element and prevent the rotor from shifting during functioning.

Figure 1:
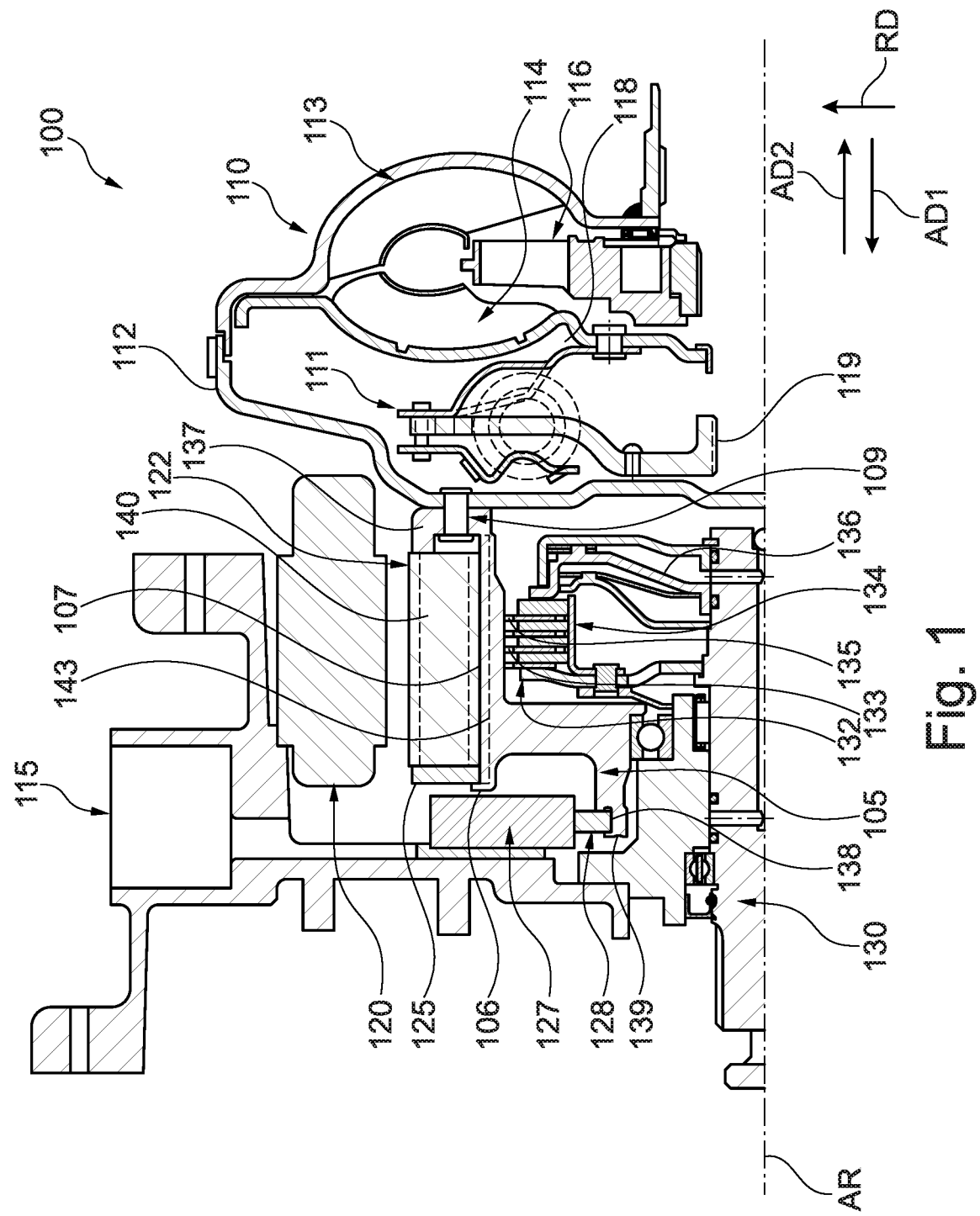
FIG. 1 is a cross-sectional view of a hybrid drive module.

FIG. 1 is a cross-sectional view of hybrid drive module 100. Hybrid drive module 100 (hereinafter referred to as module 100) may include, but is not limited to, the following components: axis of rotation AR; torque converter 110; hub 105; end plate 125; and electric motor 120 including rotor 122. Torque converter 110 may include a cover 112, impeller 113, turbine 114, and stator 116. The carrier hub 105 may be connected, including in a non-rotatable fashion, to cover 112 by one or more rivets 109. The carrier hub 105 may include a circumferential surface 107 and protrusions 106. The carrier hub 105 may also include two or more components affixed together with additional hardware in the assembly. Rotor 122 may be engaged with surface 107 and is non-rotatably connected to hub 105, for example, by splines 143. Plate 125 may be engaged with rotor 122. One or more protrusions 106 may extend radially outward in direction RD from circumferential surface 107, are formed of the material forming hub 105, are in contact with plate 125, and restrain plate 125 and rotor 122 in direction AD1.

In one example embodiment, protrusions 106 may restrain plate 125 and rotor 122 with respect to movement in axial direction AD2, opposite direction AD1. That is, protrusions 106 fix an axial position of rotor 122 on hub 105. For example, protrusions 106 are in contact with plate 125, which forces rotor 122 into contact with shoulder 137 of hub 105. Thus, rotor 122 is unable to displace in either direction AD1 or AD2.

In one example embodiment, the hub 105 may include a circumferential surface 138 and protrusions 139. While this embodiment of surface 138 may be circumferential, it may also be planar or substantially planar and not limited to a circumferential surface. The module 100 may also include a resolver rotor 128 that is engaged with surface 138. Protrusions 139 may extend radially outward in direction RD from the circumferential surface 138, are formed of the material forming hub 105, and fix rotor 128 to hub 105. The resolver 127 may be fixed to housing 115. The resolver 127 may detect the rotational position of resolver rotor 128 on hub 105 in order to control the rotation and power output of electric motor 120.

In one example, module 100 includes or, is arranged to engage, input part 130 and includes disconnect clutch 132. Part 130 is arranged to receive torque, for example, from an internal combustion engine (not shown). Clutch 132 includes at least one clutch plate 133 non-rotatably connected to hub 105, inner carrier 134 non-rotatably connected to input part 130, clutch plate 135 non-rotatably connected to inner carrier 134, and piston plate 136 axially displaceable to open and close clutch 132. Clutch 132 enables selective connection of input part 130 and cover 112. Thus, module 100 can function in at least three modes. For a first mode, clutch 132 is open and electric motor 120, via rotor 122, is the only source of torque for torque converter 110. For a second mode, clutch 132 is closed, electric motor 120 is not driving torque converter 110, and the only source of torque for torque converter 110 is input part 130 via the disconnect clutch. For a third mode, clutch 132 is closed and motor 120 is used to provide torque to input part 130 to start an internal combustion engine (not shown) attached to input part 130.

In an example embodiment, torque converter 110 may include a torsional vibration damper 111 with input part 118 connected to turbine 114, an output part 119 arranged to connect to a transmission input shaft (not shown), and at least one spring 121 engaged with input part 118 and output part 119.

In an example embodiment, hub 105 may be made of cast aluminum, although other materials may be utilized, such as a cast ductile iron. In a carrier hub 105 with two or more major components, different materials may be used amongst components. Protrusions 106 and 139 may be a material different from cast aluminum (e.g. not cast) of the hub and are not formed by any type of bending operation. Instead, protrusions 106 and 139 may be fabricated by staking the cast hub. For example, deformed portions may be created respective to portions of the cast hub with one or more punches. The deformed portions may form protrusions 106 and 139 and secure the rotor and resolver rotor to the hub without fasteners or other added materials. Specifically, the material deformed and displaced by the staking forms protrusions 106 and 139 and creates respective interference fits between protrusions 106 and plate 125 and between protrusions 139 and rotor 127.

The difference between protrusions formed in a casting process and staked protrusions may be exemplified by the physical characteristics of the material. For example, aluminum, forming the cast hub (and not staked or deformed by staking) and the material forming the deformed protrusions. For example, the material forming the cast hub and not staked or deformed by the staking (for example not including material adjoining protrusions 106 or 139) has 'x' number of lattice defects, including point defects or imperfections, line defects, or surface defects-grain boundaries, per unit of volume. The material forming protrusions 106 may have 'y', greater than 'x', number lattice defects, including point defects or imperfections, line defects, or surface defects-grain boundaries, per unit of volume. The material forming protrusions 139 may have 'z', greater than 'x', number lattice defects, including point defects or imperfections, line defects, or surface defects-grain boundaries, per unit of volume. The increase in lattice defects results from the deformation, by the staking process, of the material forming the original cast hub.

In an example embodiment, hub 105 is made of aluminum, which may be used to reduce the weight and rotational inertia of the hub, and cover 112 is made of steel, reducing the cost of manufacturing cover 112 and increasing the durability of cover 112. In another embodiment the carrier hub may be made from 4140 steel due to its high ductility behavior. In other embodiments, other materials may be used for the carrier hub, including but not limited to stainless steel or other metals and alloys, cast ductile iron, or other similar materials.

Figure 2:
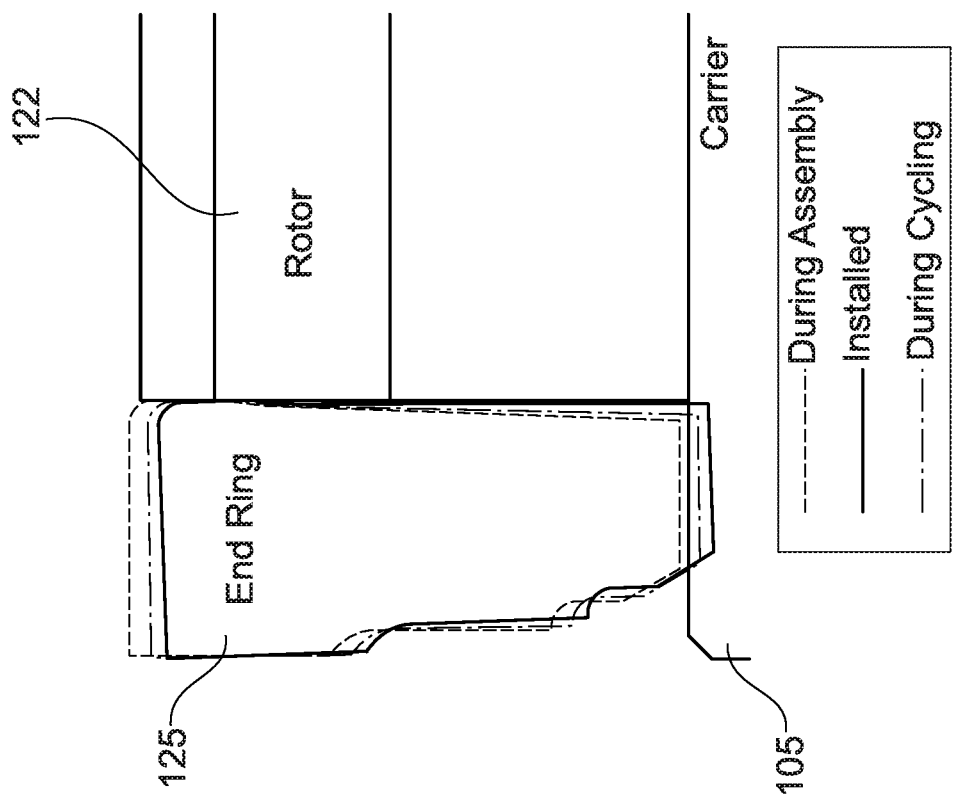
FIG. 2 is an example depicting an end ring on the carrier during installation, assembly, and cycling conditions.

FIG. 2 is an example depicting an end ring on the carrier during various conditions, including installation, assembly, and cycling conditions. End plate 125 may be in contact with the rotor 122 and the carrier hub 105. As depicted in FIG. 2, the end plate 125 may have various areas or locations that the end plate 125 settles onto with respect to the rotor 122 and the carrier 105. Because of variety in the thermal expansion factor of the end plate 125, rotor 122, and carrier 105, each condition may make those components expand or contract based on the pressure or temperature in various conditions. For example, the end plate 125 is depicted to be substantially planar with the rotor 122 during the assembly process based on expansion/contract of the end plate 125 and rotor 122. Different materials may have different expansion factors based on the temperature and pressure of the end ring 125 and carrier 105.

When an end ring 125 is installed onto the carrier 105, the end ring 125 and carrier 105 may have different thermal expansion factors. When the end ring 125 is heated up, a press may push the end ring 125 to cause a deformity at the contact point of the end ring 125 and carrier 105. The press may apply pressure to various points of the end ring 125, but may ideally apply pressure at an area or point where the end plate retains a relatively large load of the carrier 125 or rotor 122. Upon the end ring 125 being cooled, a shrink fit or interference fit may form between the end ring 125 and carrier 105.

As shown in FIG. 2, the end ring 125 may be positioned in an intermediary point at during the cycling phase that is in between an installed phase or during assembly. Of course, the location may vary based on the thermal expansion factors of the materials used for the end ring 125 and carrier 105.

Figure 3:
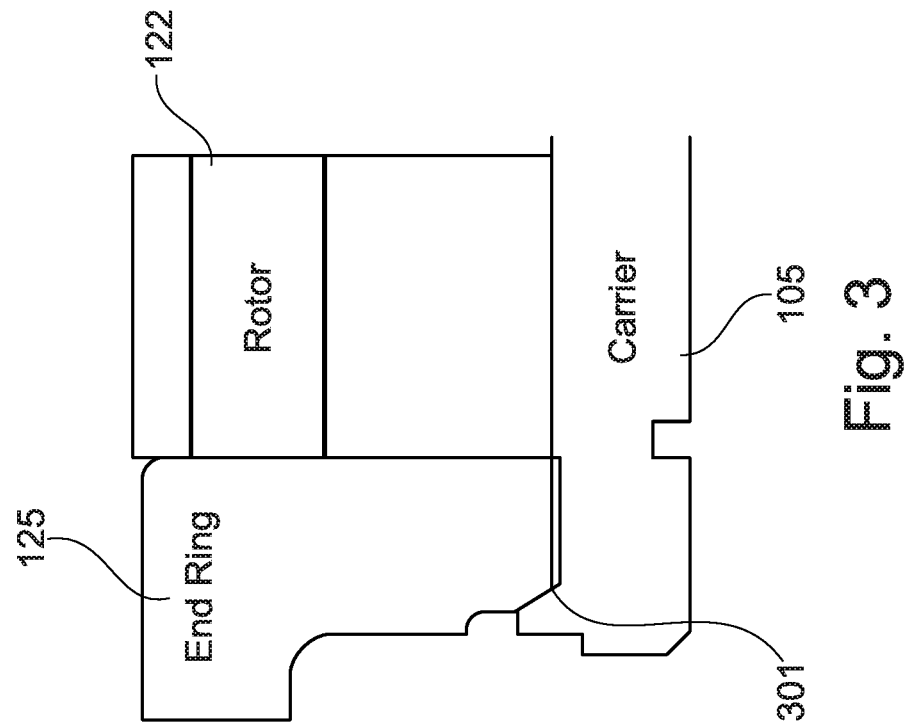
FIG. 3 is an example of a staking geometry utilized for an end ring secured to a rotor segment and a carrier hub.

FIG. 3 is an example of staking geometry utilized for an end ring 125 securing a rotor segment to the carrier hub 105. The staking process may be utilized for mechanical retention to prevent a "walking phenomenon" at elevated temperatures of the hybrid module 100. For example, the carrier hub 105 may be made from 4140 steel, or other materials. The end ring 125 may be a stainless steel material. In some embodiments, the end ring 125 and carrier 105 may be the same material. In an embodiment which utilizes the end ring 125 and carrier 105 of the same material, it may be beneficial to utilize austenitic or non-magnetic material. Such material may prevent magnetic flux from the rotor does not escape.

The staking may utilize a variety of geometry to create an interference fit between the end ring 125 and carrier 105. The staking process may include an end ring that has geometry corresponding to the carrier hub in order to create an interference fit. For example, the end ring may include a 45-degree angle that aligns with a 45-degree angle of the carrier hub forming the interference fit that prevents movement of the rotor. In another embodiment, the end ring may include an angle greater than 45 degrees and is aligned with a protrusion of the carrier hub with an angle less than 45 degrees, or vice versa.

While a staking process may be utilized to create an interference fit between the carrier hub 105 and the rotor 122, a snap ring or circlip located behind the end ring 125 may be utilized. The snap ring or circlip may be attached to the end ring 125 and the hub 105 in order to secure the end ring 125 to the rotor 122. A spring element may also be utilized with the shrink fit installation, or utilized in a scenario that does not utilize the shrink fit installation. The spring element may be placed onto the end ring 125 and positioned between the end ring 125 and the carrier 105.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A hybrid drive module, comprising:
   a cover of a torque converter;
   a carrier hub connected to a rotor of an electric motor and the cover, the carrier hub including an outer surface and a protrusion extending axially and radially outward from the outer surface, wherein the outer surface of the carrier hub is in contact with an end ring inner surface and a rotor inner surface; and
   an end ring disposed between the protrusion and the rotor and in contact with the outer surface, wherein the end ring is engaged with the protrusion of the carrier hub via a protrusion surface extending both axially and radially outward from a rotation axis, and the end ring is engaged with a radial surface of the rotor, and the protrusion restrains the end ring and the rotor utilizing an interference fit between the carrier hub and the end ring.

2. The hybrid drive module of claim 1, wherein the interference fit includes a chamfer on the carrier hub and the end ring.

3. The hybrid drive module of claim 1, wherein the interference fit is located between the protrusion and the end ring.

4. The hybrid drive module of claim 1, wherein geometry of the carrier hub and the end ring correspond with one another to form the interference fit.

5. The hybrid drive module of claim 1, wherein the interference fit is configured to provide a dead stop for axial translation of the end ring.

6. The hybrid drive module of claim 1, wherein the end ring and the carrier hub is made utilizing cold-finished steel.

7. The hybrid drive module of claim 6, wherein the cold-finished steel includes 4140 steel.

8. The hybrid drive module of claim 1, wherein the protrusion is plastically deformed.

9. The hybrid drive module of claim 1, wherein the end ring and the carrier hub are of a different material.

10. The hybrid drive module of claim 1, wherein the interference fit is between the carrier hub and a corner of the end ring.

11. A method of securing components to a carrier hub of a hybrid drive module including a torque converter and an electric motor including a rotor, comprising:
    connecting an end ring to the rotor and a protrusion of the carrier hub, wherein the protrusion is extending axially and radially outward from an axis of rotation, wherein the end ring includes a protrusion surface abutting the protrusion;
    heating the end ring; and
    providing an interference fit between the carrier hub and the end ring at the protrusion and protrusion surface by cooling the end ring.

12. The method of claim 11, wherein the method further includes forming a chamfer on the interference fit between the end ring and the protrusion.

13. The method of claim 11, wherein geometry of the carrier hub and the end ring correspond with one another to form the interference fit.

14. The method of claim 11, wherein the method further includes plastically deforming the carrier hub.

15. The method of claim 11, wherein the method further includes non-rotatably connecting the carrier hub and a cover for the torque converter.

16. A hybrid drive module, comprising:
    a carrier hub connected to a rotor of an electric motor, the carrier hub including a protrusion extending both axially and radially outward from a surface; and
    an end ring disposed between the protrusion and the rotor, wherein the end ring is engaged with the protrusion via a protrusion surface extending both axially and radially away from a rotation axis utilizing an interference fit between the carrier hub and the end ring.

17. The hybrid drive module of claim 16, wherein the carrier hub and the end ring are a same material.

18. The hybrid drive module of claim 17, wherein the same material is comprised of a non-austenitic material.

19. The hybrid drive module of claim 16, wherein the carrier hub and the end ring each include a beveled edge to form the interference fit.

20. The hybrid drive module of claim 1, wherein the carrier hub is a first material with a first thermal expansion factor and the end ring is a second material with a second thermal expansion factor that is different than the first thermal expansion factor.

* * * * *